A. OZEROWICZ.
LOCK FOR MOTOR VEHICLES.
APPLICATION FILED NOV. 10, 1917.
1,269,638.
Patented June 18, 1918.
2 SHEETS—SHEET 1.
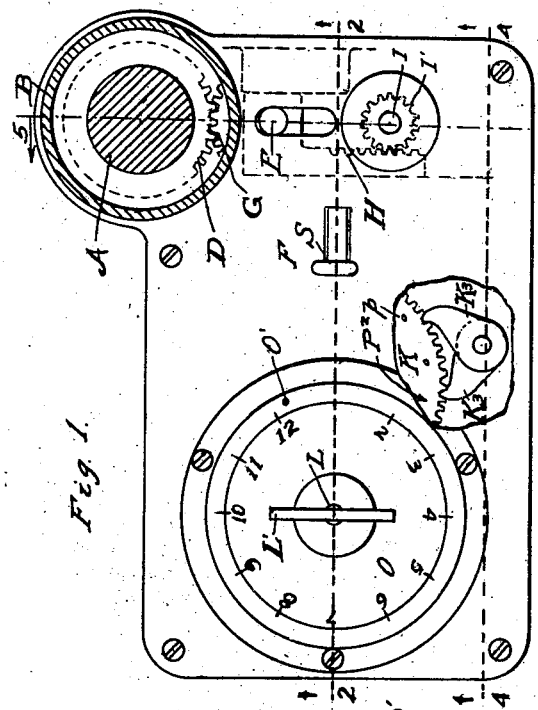
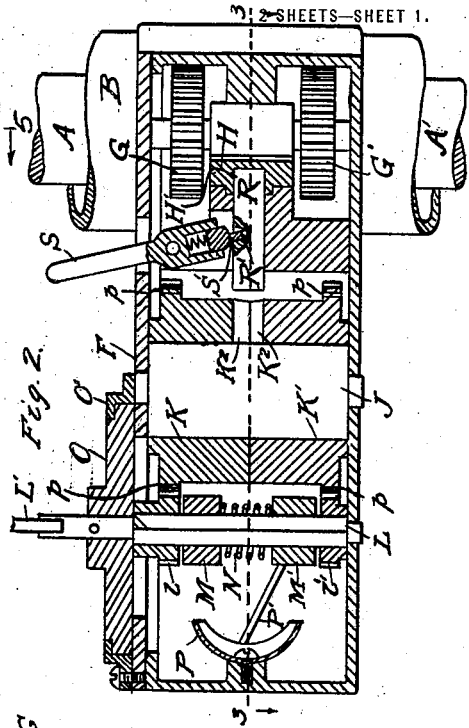
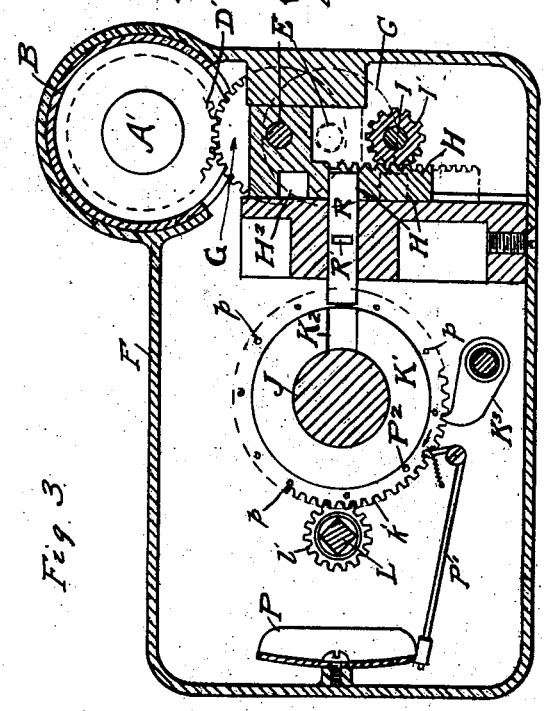
Inventor
Alexander Ozerowicz
By S. E. Thomas
Attorney A. OZEROWICZ.
LOCK FOR MOTOR VEHICLES.
APPLICATION FILED NOV. 10, 1917.
1,269,638.
Patented June 18, 1918.
2 SHEETS—SHEET 2.
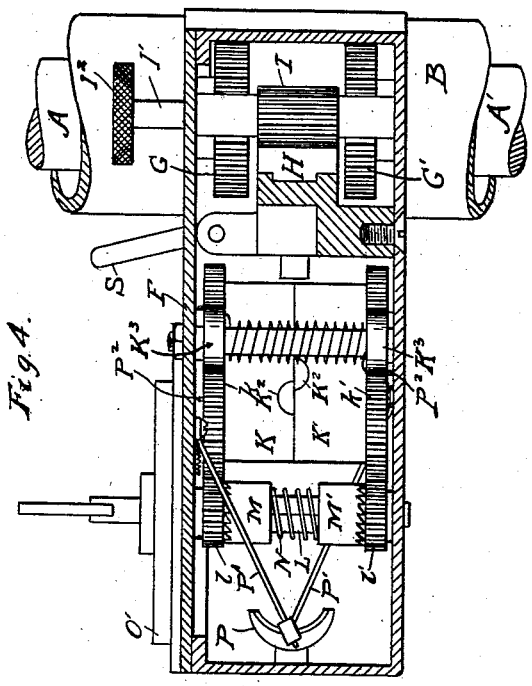
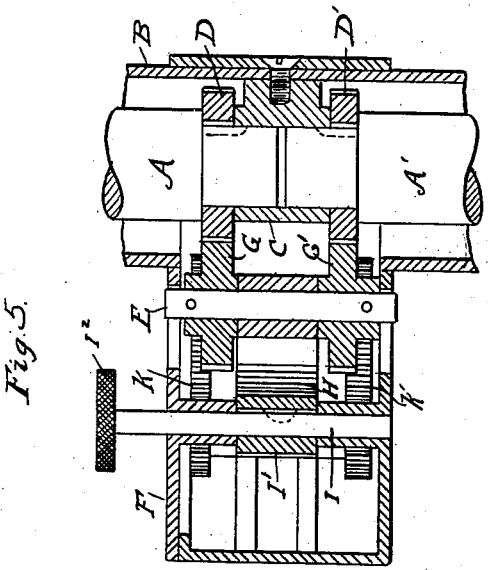

UNITED STATES PATENT OFFICE.

ALEXANDER OZEROWICZ, OF HAMTRAMCK, MICHIGAN.

LOCK FOR MOTOR-VEHICLES.

1,269,638.      Specification of Letters Patent.      Patented June 18, 1918.

Original application filed July 5, 1917, Serial No. 178,755. Divided and this application filed November 10, 1917. Serial No. 201,226.

*To all whom it may concern:*

Be it known that I, ALEXANDER OZEROWICZ, citizen of Russia, residing at Hamtramck, county of Wayne, State of Michigan, have invented a certain new and useful Improvement in Locks for Motor-Vehicles, and declare the following to be a full, clear, and exact description of the same, such as will enable others skilled in the art to which it pertains to make and use the same, reference being had to the accompanying drawings, which form a part of this specification.

My invention relates to a lock for the steering wheel of motor driven vehicles.

This is a divisional application of the patent granted to me December 11, 1917, No. 1,249,471, for locks for motor vehicles.

One of the objects of the present invention is to provide means whereby the steering wheel of a motor vehicle may be temporarily thrown out of operative relation with the steering post by the owner upon leaving the vehicle, that it may not be driven by an unauthorized person during his absence.

Another object of the invention is to provide an audible signal in connection with the locking mechanism whereby the owner, knowing the predetermined number of revolutions required to release the locking means following the signal, may actuate the mechanism accordingly, that the bolt by which that portion of the post connected with the steering wheel is held in operative relation with the lower half of the steering post may be withdrawn and the steering wheel locked in an inoperative relation thereto.

With the foregoing and other objects in view which will appear as the description proceeds, the invention resides in the combination and arrangement of parts and details of construction hereinafter described and claimed, it being understood that changes in the precise embodiment of the invention herein disclosed may be made without departing from the spirit of the same.

In the accompanying drawings forming part of this invention—

Figure 1 is a plan view of the device attached to the sleeve of the steering post,— shown in cross-section,—with a portion of the case broken away to disclose a part of the mechanism inclosed therein.

Fig. 2 is a vertical sectional view on line 2—2 of Fig. 1.

Fig. 3 is a horizontal-sectional view on line 3—3 of Fig. 2.

Fig. 4 is a vertical sectional view on line 4—4 of Fig. 1.

Fig. 5 is a vertical cross-sectional view on line 5—5 of Fig. 1.

A denotes the upper portion of a steering post to which a steering wheel (not shown) is secured. A' indicates the lower portion of the steering post controlling the inclination of the road wheels,—not shown. B designates the usual sleeve surrounding the steering post. C indicates a bearing secured within the sleeve carrying the ends of the upper and lower portion of the steering post. D denotes a gear keyed to the upper portion A;—and D' is a similar gear keyed to the lower portion A' of the steering post.

E indicates a shaft the ends of which project through elongated slots in the casing F, which is in turn secured to and supported by the sleeve B, surrounding the steering post. G and G' are pinions keyed or pinned to the shaft E, and adapted to respectively mesh with the gears D and D', of the steering post. H indicates a rack bar having an aperture at one end to receive the shaft E, which is free to turn therein. I denotes a shaft journaled in the walls of the casing. I' is a pinion carried by the shaft I, in mesh with the teeth of the rack-bar H. $I^2$ is a milled head on the end of the shaft I, for manually rotating the pinion I'. J is a post supported between the upper and lower walls of the casing on which is loosely sleeved a divided drum comprising an upper and lower portion K and K'. Integral with each section of the drum is a gear $k$, and $k'$, in mesh with pinions $l$, $l'$, mounted on the squared portion of the shaft L, journaled in the casing. Sleeved on the shaft L, are ratchet gears M and M', the teeth of which are adapted to interlock with like ratchet teeth formed on the hub of the pinions $l$, $l'$;—the teeth of the respective ratchet gears being oppositely inclined to provide for an alternative movement of pinions upon the rotation of the shaft in a direct or reverse manner.

N is a spring also sleeved upon the shaft L, the ends of which bear upon the ends of the ratchet gears M and M', to force them into engagement with the ratchet faces of the pinions $l$ and $l'$.

O is a disk pinned to the shaft L, having graduations adapted to be read in conjunction with the graduations on the annular concentric collar O', encircling the disk and attached to the case. L' is a thumb piece carried by the shaft L, for convenience in manually rotating the latter. P indicates a signal bell supported by the case, and P' are spring actuated clappers tripped by an adjustable pin P², carried by each of the gears k, and k';—each of said gears having a plurality of holes p, to provide for the adjustment of the pin P², whereby the arbitrary degree of rotation desired to be given to the drum to bring both portions K and K' of the drum into coördination may be altered as desired.

Formed in the abutting edges of portions K and K', of the drum are semicircular recesses K², which when brought into opposition through the manual adjustment of the shaft L, form a circular aperture adapted to receive a sliding bolt R, in turn shifted by a manually operated rocking arm S, pivoted to the wall of the case. Housed within a recess formed in the end of the rocking arm is a spring actuated tongue S', the projecting end of which is adapted to enter a depression R', in the bolt R;—the arrangement providing for a free movement of the bolt in either direction through the operation of the rocking arm. H', H² are spaced apertures formed in the rack-bar H, into either of which the sliding bolt R may be manually projected, and when engaged with the rack-bar as shown in full lines in Fig. 3—serves to secure the gears G and G', in meshed relation with the gears D and D' of the steering post,—thereby connecting the steering wheel attached to the upper portion A, of the post, in operative relation with the lower portion of the steering post.

K³, K³ are dogs respectively engaging the teeth of the upper and lower portions K and K', of the drum, to provide against accidental displacement of either part due to friction between the abutting edges thereof when either portion of the drum is rotated.

Having indicated the several parts by reference letters, the construction and operation of the device will be readily understood.

The upper portion of the steering post to which the steering wheel (not shown) is connected being independent of the lower portion of the post controlling the inclination of the road wheels of the vehicle, it is impossible to guide the vehicle until the upper and lower portions of the post are connected in operative relation.

This result is obtained by manually shifting the pinions G and G',—through the adjustment of the rack bar H, and pinion I,—into intermeshing relation with the gears D and D', respectively carried by the upper and lower portions of the steering post. It will thus be seen that the upper and lower portions of the steering post may be rotated by the steering wheel (not shown) as a unit. In order to secure the respective gears D, G, and D', G', in respective intermeshing relation until it is again desired to disconnect the steering wheel, the sliding bolt R is thrust through the operation of the rocking arm S, into the aperture H' of the rack-bar, as shown in Fig. 3. To secure the sliding bolt in its locked relation with the rack bar, the upper portion K, or lower portion K', (or both) of the drum are rotated by the manual operation of the shaft L, and coöperating gears M, M', and k, k',—until one or both of the recesses K², of the drum are out of register with the end of the sliding bolt;—the imperforated portion of the drum securing the sliding bolt against return until it is again desired to release the same.

To release the sliding bolt from the aperture H', of the rack-bar that the gears G and G', supported thereby may be withdrawn from intermeshing relation with those carried by the steering post, the respective portions K and K', of the drum must be rotated so that the semicircular recesses K², of each are in opposition and in register with the end of the sliding bolt. The number of revolutions to be given each portion of the drum to secure this result is arbitrary and may be varied as required, but in order that the owner of the vehicle may be able to adjust the drum so that the sliding bolt may be operated, the signal bell P, (the clappers of which are tripped by the removable pins P², carried by each section of the drum) is provided, and upon the alarm being sounded the operator starts to count the predetermined number of clockwise and counter-clockwise revolutions necessary to bring the semicircular recesses of each section of the drum into opposition and into alinement with the end of the sliding bolt. The drum having been thus properly adjusted, the bolt is withdrawn through the manual operation of the rocking arm S. The rack-bar is then shifted through the manual adjustment of the shaft I, and pinion I', until the aperture H², of the rack-bar is opposite the end of the sliding bolt, the bolt is then forced into the aperture H² of the rack-bar and the drum rotated as previously explained, thus securing the pinions G and G' in disengaged relation to the gears D and D', of the upper and lower sections of the steering post and thereby rendering the steering wheel ineffective for controlling the direction of the vehicle,—it being possible, however, to still tow the vehicle as required by the police and fire ordinances of many cities. To again lock the steering wheel to the lower portion of the steering post, the operation previously described is repeated.

Having thus described my invention, what I claim is:—

1. In a device of the character described, a divided steering post, a gear keyed to each portion of the post, a laterally movable shaft, pinions keyed to the shaft, a rack-bar coupled at one end to the movable shaft, a pinion in mesh with the rack-bar, means for manually rotating the pinion to shift the rack-bar, whereby the first named pinions may be brought into intermeshing relation with the gears carried by the steering post that the latter may be operated as a unit, or released therefrom as desired, and means for locking the rack-bar in either of said positions.

2. In a device of the character described, a divided steering post, a gear keyed to each portion of the post, a sleeve for the post, a case supported by said sleeve, a laterally movable shaft projecting through slots in the case, pinions keyed to the shaft adapted to be brought into mesh with the gears of the steering post or released therefrom, a rack bar coupled to the shaft, a manually rotatable pinion for shifting the rack-bar, and means for locking the rack-bar, whereby the pinions may be held in coöperation or released relation to the gears of the steering post.

In testimony whereof, I sign this specification in the presence of two witnesses.

ALEXANDER OZEROWICZ.

Witnesses:
S. E. THOMAS,
N. H. HOUSE.

Copies of this patent may be obtained for five cents each, by addressing the "Commissioner of Patents, Washington, D. C."